(12) United States Patent
Dybsetter

(10) Patent No.: US 7,657,680 B2
(45) Date of Patent: Feb. 2, 2010

(54) MULTIPLE BUS INTERFACE CONTROL USING A SINGLE CONTROLLER

(75) Inventor: Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/624,582

(22) Filed: Jan. 18, 2007

(65) Prior Publication Data
US 2008/0126619 A1 May 29, 2008

Related U.S. Application Data

(60) Provisional application No. 60/805,455, filed on Jun. 21, 2006.

(51) Int. Cl.
*G06F 13/42* (2006.01)
*G06F 3/00* (2006.01)
*G06F 5/00* (2006.01)

(52) U.S. Cl. .......................... 710/106; 710/38; 710/105

(58) Field of Classification Search ................... 710/38, 710/105, 106
See application file for complete search history.

(56) References Cited

U.S. PATENT DOCUMENTS 6,477,611 B1 * 11/2002 Chang ........................ 710/313

* cited by examiner

*Primary Examiner*—Niketa I Patel
*Assistant Examiner*—Farley J Abad
(74) *Attorney, Agent, or Firm*—Workman Nydegger

(57) ABSTRACT

Mechanisms for configuring an integrated circuit to select one of multiple external device interfaces at a time to use during communication with external devices. The integrated circuit includes a control mechanism, a selection mechanism, and a plurality of external device interfaces. The plurality of device interfaces allow the integrated circuit to communicate with various external devices that support different communication protocols. The control mechanism is configured to designate the selection of one of the plurality of device interfaces for use in communicating with an external device. The control mechanism makes use of the selection mechanism to select the designated device interface to communicate with using the communication protocol supported by the selected interface. The communication may be receiving data from the interface or providing data to the interface. Non-selected interfaces are put in an inactive state.

19 Claims, 4 Drawing Sheets

MULTIPLE BUS INTERFACE CONTROL USING A SINGLE CONTROLLER

CROSS-REFERENCE TO RELATED APPLICATIONS

This application claims the benefit of U.S. Provisional Application No. 60/805,455, filed Jun. 21, 2006, which is incorporated herein by reference in its entirety.

BACKGROUND OF THE INVENTION

1. The Field of the Invention

The present invention relates generally to integrated circuits. More specifically, the present invention relates to mechanisms for configuring the integrated circuit to select one of multiple external device interfaces at a time to use during communication with external devices.

2. Background and Relevant Technology

Electronic and computing technology has transformed the way that we work and play. Many electronic or computing systems rely on a variety of components that cooperatively interact to perform complex functions. Many of these components are integrated circuit chips.

The integrated circuits include the complex circuitry that performs the complex functions. The integrated circuits tend to be composed of a semiconductor (e.g., silicon) or dielectric (e.g., sapphire) upon which the circuitry as fabricated.

Integrated circuits often come in a package that allows the integrated circuit chip to interface with the printed circuit board, and provides some level of protection for the integrated circuit chip. The protection might include Electro-Magnetic Interference (EMI) shielding, temperature dissipation structures, and/or physical barrier protection against inadvertent contacting the delicate circuit structures on the chip. The package includes a number of pins that are appropriately positioned such that the package may be plugged into a socket on the integrated circuit board. Many of these pins act as an external device interface that allows the integrated circuit chip to send signals to and receive signals from other electrical components in an electrical system.

Typically, the external device interface consists of external connections that are configured for a particular external device. For example, the external device interface may be a two wire interface configured to communicate with an external chip or device using the I²C communication protocol.

In many applications, a integrated circuit chip may include a master serial controller that is used to control the external device interface. For example, the serial controller may provide data to the I²C interface for communication to the external device and may receive signals from the external device interface that have been received from the external device.

Many integrated circuit chips, however, communicate with multiple external devices and therefore have multiple external interfaces. For example, a chip may have the I²C interface discussed above and a Serial Peripheral Interface (SPI) interface. The SPI interface is a common four wire interface. In that case, the chip would need two master serial controllers to control both of the different interfaces. If the chip had several external device interfaces, then the number of necessary master serial controllers would increase according to the number of interfaces.

Having a single serial controller for each device interface is expensive. In addition, valuable chip space is needlessly used by each of the individual controllers, which can drive up fabrication costs. Also, valuable chip resources are consumed to support each serial controller. Therefore, what would be advantageous is a single serial controller capable of selecting and controlling multiple external device interfaces.

BRIEF SUMMARY

The foregoing problems with the prior state of the art are overcome by the principles of the present invention, which are directed towards mechanisms for an integrated circuit to use a single controller to control multiple external device interfaces. The integrated circuit includes a controller or control mechanism, a selection mechanism, and multiple external device interfaces supporting different communication protocols that couple the integrated circuit with multiple external devices.

The controller may be configured in a variety of ways, including microcode from other integrated circuit components, to designate and select a particular one of the external device interfaces for use in communication with an external device. The controller sends a signal to the selection mechanism indicating selection of the designated device interface. The controller also sends other signals to the selection mechanism that deactivate the non-selected device interfaces. The controller will communicate with the selected device interface by sending and receiving data using the communication protocol supported by the interface.

This process will continue until the controller is configured to designate a different device interface for selection. The controller will send out the signal and the new interface will be selected by the selection mechanism for communication while the previously selected interface will be deactivated along with the other non-selected device interfaces.

Accordingly, the principles of the present invention allow a single configurable controller to control communication using multiple external device interfaces. This process saves on hardware as a controller for each interface is not required. In turn, less integrated circuit resources are needed to support multiple controllers. Accordingly, cost is reduced and chip space is saved.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The principles of the present invention relate to mechanisms for configuring an integrated circuit to select one of multiple external device interfaces at a time to use during communication with external devices. The integrated circuit includes a control mechanism, a selection mechanism, and a plurality of external device interfaces. The plurality of device interfaces allows the integrated circuit to communicate with various external devices that support different communication protocols.

The control mechanism is configured to designate the selection of one of the plurality of device interfaces for use in communicating with an external device. The control mechanism makes use of the selection mechanism to select the designated device interface to communicate with. The communication may be receiving data from the interface or providing data to the interface. Non-selected interfaces are put in an inactive state.

Figure 1:
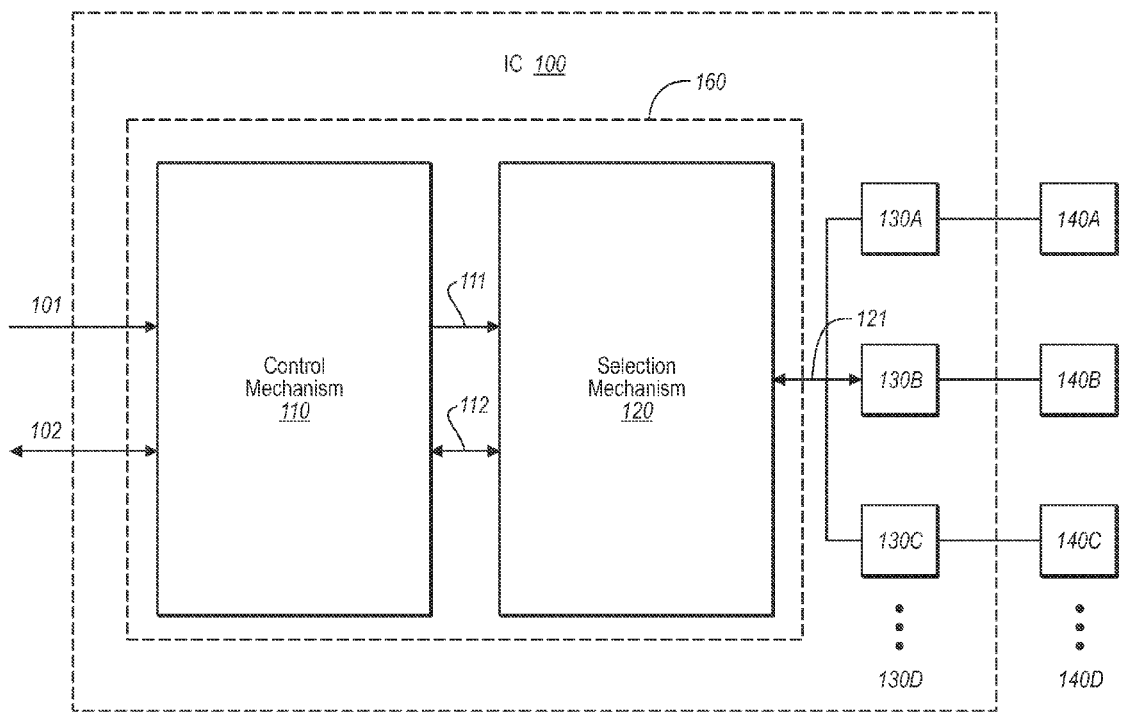
FIG. 1 schematically illustrates an example of an integrated circuit including mechanisms for a single controller to control multiple external device interfaces in accordance with the principles of the present invention.

Referring to the drawings, FIG. 1 illustrates an integrated circuit 100 in which the principles of the present invention may be implemented. Integrated circuit 100 may be fabricated on a substrate by any method known to one skilled in the art and may include any number of terminals, some of which may be structured to be external device interfaces. The precise number of terminals and construction of integrated circuit 100 are not important to the principles of the present invention.

Integrated circuit 100 includes a configurable control mechanism 110. Control mechanism 110 is used by the integrated circuit 100 to designate and select an external device interface to be used during communication between the integrated circuit 100 and an external device. Control mechanism 110 may receive configuration data from other components in integrated circuit 100 such as a processor or from a source external to the integrated circuit. Alternatively, control mechanism 110 may be configured to access the configuration data from another component of integrated circuit 100. Both possibilities are represented by line 101. The source of the configuration data and how the control mechanism obtains the data is unimportant to the principles of the present invention. In some embodiments, control mechanism 110 is a master serial controller capable of receiving microcode for configuration. For example, the master serial controller may be a state machine that is configured to change states upon receiving the configuration data.

Control mechanism 110 also receives communication data from other components in integrated circuit 100 such as a processor that will be communicated to an external device using the selected external host interface. Control mechanism 110 is also structured to receive communication data from the external device using the selected external device interface and provide the data received to other components of integrated circuit 100. Both of these operations are represented by bi-directional line 102.

In some embodiments, control mechanism 110 includes a serial controller and a generic serializer/deserialiser. The serial controller and the serializer/deserializer may be one component in some embodiments or they may be separate components in other embodiments. The serial controller receives the communication data from other integrated circuit 100 components as described. The controller then may provide the communication data to the serializer/deserializer for conversion to serial data. The serial data is then provided to the selected external device interface for communication with an external device. The selected external device interface provides the received serial data to the serializer/deserializer where it converted from serial data. The controller may then receive the data from the serializer/deserializer and provide it to other components in the integrated circuit.

Integrated circuit 100 also includes a selection mechanism 120. Selection mechanism 120 is coupled to control mechanism 110 and includes hardware, which may be digital hardware, analog hardware, or a combination of both, that is used by the control mechanism to select an external device interface for use and to provide communication data to the selected interface. In some embodiments, control mechanism 110 and selection mechanism 120 are included in a single component within integrated circuit 100 as represented by dashed box 160. In other embodiments, control mechanism 110 and selection mechanism 120 are separate components within integrated circuit 100.

Selection mechanism 120 receives a signal from the control mechanism 110 represented by line 111 that indicates which external device interface has been designated by the control mechanism for use. The selection mechanism then selects the appropriate interface by facilitating the sending of communication data from the control mechanism 110 to the selected external device interface 130 as represented by line 112. Line 112 is bi-directional to indicate that the selection mechanism 120 also facilitates the sending of communication data from the selected device interfaces 130 to the control mechanism 110.

Selection mechanism 120 also is used to deactivate the non-selected device interfaces. This may be accomplished by providing inactive default setting data to the non-selected device interfaces. The non-selected device interfaces remain in the deactivated state until such a time that they are selected for use by the control mechanism and the selection mechanism.

Integrated circuit 100 also includes external device interfaces 130, shown in FIG. 1 as external device interfaces 130A, 130B, and 130C and potentially any additional number as illustrated by ellipses 130D. The external device interfaces 130 may be I/O pins that have been previously configured to support the various communication protocols. An example of configuring I/O pins in this manner is described in commonly-assigned, co-pending U.S. patent application Ser. No. 10/970,530 filed Oct. 21, 2004, which is incorporated herein by reference in its entirety.

External device interfaces 130 are structured to connect the integrated circuit to multiple external devices. The external device interfaces 130 support different communication protocols depending on how they have been configured. For example, FIG. 1 shows three external devices 140 that each uses a different communication protocol: a Serial Peripheral Interface (SPI) device 140A coupled to external device interface 130A, an I²C device 140B coupled to external device interface 130B, and a Finisar Serial Bus (FSB) device 140C coupled to external device interface 130C. FSB is a proprietary two wire interface, and is described in commonly-assigned co-pending U.S. patent application Ser. No. 10/814,024 filed Mar. 31, 2004, and incorporated herein by reference in its entirety. Note that ellipses 140D is illustrated to represent that any number of additional external devices may also be coupled to integrated circuit 100.

The selected external device interface 130 provides communication data received from the selection mechanism 120 over bi-directional line 121 to its coupled external device. This external device interface is also able to provide communication data to the selection mechanism 120 over bi-directional line 121 from its coupled external device. The non-selected external device interfaces receive inactive default data from the selection mechanism 120 which puts them in an inactive or stand-by state.

FIG. 1 is illustrated to provide a schematic overview of the high level functionality of the various mechanisms of integrated circuit 100 that allow a single control mechanism to control the use of multiple external device interfaces. In any given circuit implementation of this functionality, various circuit components may be used in the implementation. Accordingly, there may be many different circuit implementations of the present invention. Although, a specific circuit example will now be described, the principles of the present invention are not limited to any specific circuit.

Figure 2:
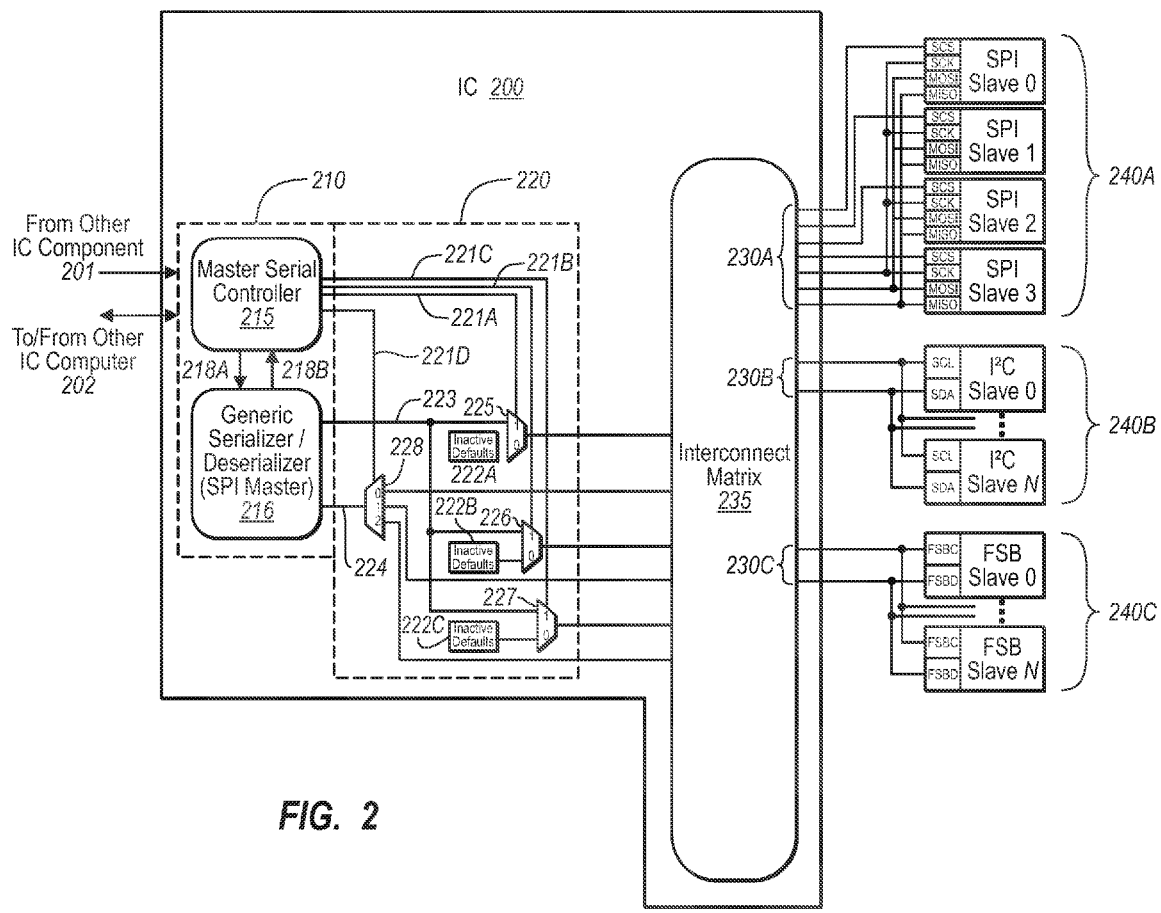
FIG. 2 schematically represents an embodiment of a circuit diagram of the mechanisms of FIG. 1.

Referring to FIG. 2, an example integrated circuit 200 is shown. FIG. 2 shows a single control mechanism 210 that may be used to control the selection of multiple external device interfaces. Control mechanism 210, which is an example of control mechanism 110 in FIG. 1, consists of a serial controller 215 coupled to a generic serializer/deserializer 216. Connections 201 and 202 connect controller 215 with other components of integrated circuit 200 such as a processor. Connection 201, which is an example of line 101 in FIG. 1, is used to send configuration data to controller 215. Connection 202, which is an example of line 102 in FIG. 1, is a bi-directional connection that is used to send communication data to and from controller 215. As mentioned, controller 215 is coupled to generic serializer/deserializer 216 by connections 218A and 218B, which are used to send communication data to the serializer/deserializer for conversion to serial data and to send deserialized data to the controller.

Integrated circuit 200 also includes a selection mechanism 220, which is an example of selection mechanism 120 of FIG. 1. Selection mechanism 220 is used by the control mechanism to select a designated external device interface. In this embodiment, the selection mechanism is comprised of a plurality of selection multiplexers 225, 226, and 227 and a plurality of registers 222A, 222B, and 222C containing inactive default data. As mentioned, the use of three multiplexers and three registers is for example only and it is possible that there may be any number of additional multiplexers and registers or entirely different circuitry comprising selection mechanism 220.

Selection multiplexers 225, 226 and 227 have a selection node coupled to the controller 215 by selection connections 221A, 221B, and 221C respectively. Multiplexers 225, 226 and 227 also have a first input node, or a communication data transfer node, coupled to serializer/deserializer by connection 223 for transmitting serial data to an external device interface. A second input node, or a default node, of the selection multiplexers is coupled to registers 222A, 222B, and 222C containing the inactive default setting data.

Selection mechanism 220 also includes a receive multiplexer 228 having a selection node coupled to controller 215 by connection 221D. In addition, receive multiplexer 228 has a plurality of input nodes coupled to a one of the external device interfaces. An output node is coupled to the serializer/deserializer 216.

Also shown in FIG. 2 is a plurality of external device interfaces 230 that connect to integrated circuit 200 by use of an interconnect matrix 235 Interconnect matrix 235 is implemented to allow the connection of multiple external devices without increasing the footprint of integrated circuit 100. However, each interface may be considered a single interface as it connects separate external devices to the integrated circuit. In this example, there are three external device interfaces depicted that connect the integrated circuit 200 to external devices: a SPI interface 230A for use with SPI devices 240A, an I²C interface 230B for use with I²C devices 240B and an FSB interface 230C for use with FSB devices 240C.

As has been mentioned previously, the circuitry of integrated circuit 200 is advantageous in that it allows a single control mechanism to control the selection of different external device interfaces that support different communication protocols. The operation of integrated circuit 200 will now be explained. Suppose that integrated circuit 200 desired to communicate with a SPI device 240A. An integrated circuit component such as a processor may relay this information to control mechanism 210. Specifically, microcode instructions are sent to controller 215 over connection 201 configuring the controller to select the SPI external device interface 230A. In addition, SPI communication data is also provided to the controller 215 over the connection 202 from the processor or other component of the integrated circuit 100.

The controller 215 sends selection signals to multiplexers 225, 226 and 227 in selection mechanism 220 over connections 221A-C respectively. Since the SPI interface 230A has been designated for selection, the controller will send a binary 1 to the selection node of multiplexer 225, which will select the communication data transfer node. Additionally, controller 215 will send a binary 0 to the selection node of multiplexers 226 and 227, which will select the default node.

While the controller is sending out selection signals to the multiplexer, it is also sending the SPI communication data to the serializer/deserializer 216 for conversion to serial data. Once converted, serializer/deserializer 216 sends the serial data one bit at a time over connection 223 to the selection multiplexers in the selection mechanism 220. In this case, multiplexer 225 has been selected and so the communication data will be passed through multiplexer 225 to SPI device interface 230A, where it will be sent to a SPI device 240A.

Multiplexers 226 and 227, on the other hand, were not selected by controller 215. As a result, inactive default settings contained in registers 222B and 222C are passed to the I²C interface and the FSB interface respectively. The default settings will keep these interfaces in a stand-by state until such a time as the default settings are removed by the interface being selected by controller 215 for use. In this way, the single control mechanism has selected one external device for use in communication while putting the others in a stand-by mode, thus allowing the integrated circuit to communicate with the desired external device using the desired communication protocol.

Controller 215 also sends out a selection signal to receive multiplexer 228 over connection 221D. This selection signal will select the input node coupled to the SPI external device interface 230A. When the SPI device 240A sends communication data to integrated circuit 200 through external device interface 230A, the communication data will pass through multiplexer 228 and be provided to serializer/deserializer 216 by connection 224. Serializer/deserializer 216 deserializes the data and then provides it to controller 215 over connection 218B. The communication data may then be provided to other components in integrated circuit 200.

The process described above may be repeated when the integrated circuit 200 desires to communicate with a different external device. For example, suppose integrated circuit 200 desires to communicate with a FSB device 240C. A microcode instruction is sent over connection 201 to configure controller 215 to select the FSB external device interface 230C. FSB communication data is also provided to the controller.

A selection signal is sent over lines 221A, 221B and 221C to multiplexers 225, 226 and 227 respectively. The selection signal sends a binary 1 to multiplexer 227, which causes multiplexer 227 to pass the FSB communication data that is provided by the serializer/deserializer 216 over connection 223 to the FSB interface 230C. Multiplexer 225 and 226, on the other hand, receive a binary 0 at the selection node, which causes multiplexers 225 and 226 to pass the inactive default settings contained in registers 222A and 22B to the SPI interface 230A and the I²C interface 230B respectively. As a result, the FSB interface may actively send communication data to a FSB external device 240C while the SPI interface and the I²C interface are put in a stand-by state.

The FSB interface 230C may also receive communication data from the FSB external device 240C. The controller 215 sends a selection signal to receive multiplexer 228 over connection 221D. This selection signal selects the input node coupled to the FSB external device interface 230C. When the FSB device 240C sends communication data to integrated circuit 200 through external device interface 230C, the communication data will pass through multiplexer 228 and be provided to serializer/deserializer 216 by connection 224.

In some embodiments, control mechanism 220 may be simultaneously configured to drive more than one external device interface. For example, the configuration microcode received by controller 215 may include configuration data for the SPI interface, the FSB interface and the I²C interface. While the control mechanism will only select and transfer communication data to one interface at time, there would be no need for the control mechanism to receive additional configuration data until the control mechanism had processed the configuration data for all three interfaces.

Having described the features of the present invention with respect to a specific circuit example in FIG. 2, the broad principles of the present invention are not limited to any specific circuit. There are countless circuits that may be used to implement the features of the present invention.

Figure 3:
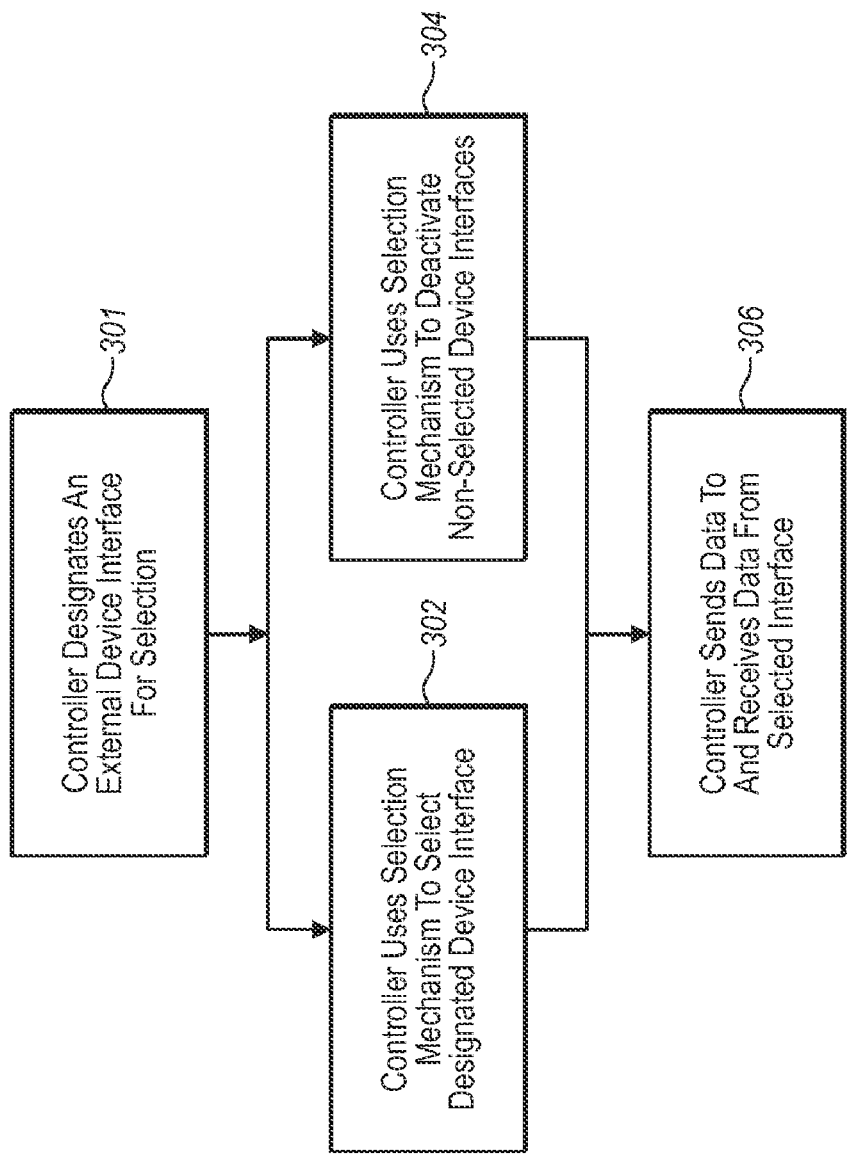
FIG. 3 illustrates a flowchart for a single controller to select and use multiple external device interfaces for communication between an integrated circuit and a plurality of external devices in accordance with the principles of the present invention.

FIG. 3 illustrates a flowchart of a method 300 for a single controller to select and use multiple external device interfaces for communication between an integrated circuit and a plurality of external devices. First, the controller designates an external device interface for selection (act 301). This may be accomplished by the controller receiving configuration data as described in relation to integrated circuit 200.

The controller then uses the selection mechanism to select the designated external device interface for use (act 302). The controller also uses the selection mechanism to deactivate the non-selected external device interfaces, thus putting them in a stand-by state (act 303). For example, in the embodiment described with respect to FIG. 2, the controller sends a selection signal to the selection node of multiplexers 225-227. The selected multiplexer passes communication data to the selected external interface, while the non-selected multiplexers pass inactive default data to the other external interfaces.

Additionally, the controller sends a selection signal to receive multiplexer 228, which causes the multiplexer to pass data from the selected external device interface to the control mechanism.

Finally, the controller sends and receives data from the selected device interface (act 304). This enables the integrated circuit to communicate with an external device using the communication protocol supported by the device. This process may be repeated whenever the integrated circuit desires to communicate with a different external device.

Having described the basic principles of the present invention, a particular example environment will now be described, although the present invention is not limited by any means to this example environment.

Figure 4:
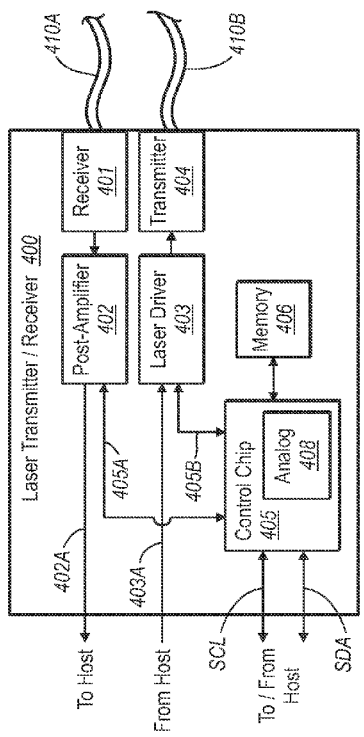
FIG. 4 illustrates a schematic diagram of a laser transmitter/receiver that represents one of many systems in which the principles of the present invention may be employed.

FIG. 4 illustrates a laser transmitter/receiver 400 in which the principles of the present invention may be employed. While the laser transmitter/receiver 400 will be described in some detail, the laser transmitter/receiver 400 is described by way of illustration only, and not by way of restricting the scope of the invention. The principles of the present invention are suitable for 1G, 2G, 4G, 8G, 10G and higher bandwidth fiber channels. Furthermore, the principles of the present invention may be implemented in laser transmitter/receivers of any form factor such as XFP, SFP and SFF, without restriction The laser transmitter/receiver 400 receives an optical signal from fiber 410A using receiver 401. The receiver 401 transforms the optical signal to an electrical signal and provides that electrical signal to a post-amplifier 402. The post-amplifier 402 amplifies the signal and provides the amplified signal to the host as represented by arrow 402A.

The laser transmitter/receiver 400 may also receive electrical signals from the host for transmission onto the fiber 410B. Specifically, the laser driver 403 receives the electrical signal as represented by the arrow 403A, and drives the transmitter 404 (i.e., the laser) with signals that cause the transmitter 404 to emit onto the fiber 410B optical signals representative of the information in the electrical signal provided by the host.

The behavior of the receiver 401, the post-amplifier 402, the laser driver 403, and the transmitter 404 may vary dynamically due to a number of factors. For example, temperature changes, power fluctuations, and feedback conditions may each affect the performance of these components. Accordingly, the laser transmitter/receiver 400 includes a control chip 405, which evaluates temperature and voltage conditions, and receives information from the post-amplifier 402 (as represented by arrow 405A) and from the laser driver 403 (as represented by arrow 405B), which will allow the control chip 405 to counteract the dynamically varying performance, and detect when there is a loss of signal.

Specifically, the control chip 405 may counteract these changes by adjusting settings on the post-amplifier 402 and/or the laser driver 403 as represented by the arrows 405A and 405B. These settings adjustments are quite intermittent since they are only made when temperature or voltage or other low frequency changes so warrant. Accordingly, the setting adjustments may be made by a guaranteed header two-wire interface of the type described above with respect to FIGS. 1, 2, and 3A through 3C.

The control chip 405 has access to a non-volatile memory 406, which in one embodiment, is an Electrically Erasable and Programmable Read Only Memory (EEPROM). Data and clock signals may be provided from the host to the control chip 405 using the serial clock line SCL, and the serial data line SDA or other implemented host communication interface. Also data may be provided from the control chip 405 to the host using serial data signal SDA to allow for digital diagnostics and readings of temperature levels, transmit/receiver power levels, and the like.

The control chip 405 includes both an analog portion 408 and a digital portion. Together, they allow the control chip to implement logic digitally, while still largely interfacing with the rest of the laser transmitter/receiver 400 using analog signals. For example, the analog portion 408 may contain digital to analog converters, and analog to digital converters, high speed comparators (e.g., for event detection), voltage based reset generators, voltage regulators, voltage references, clock generator, and other analog components.

Figure 5:
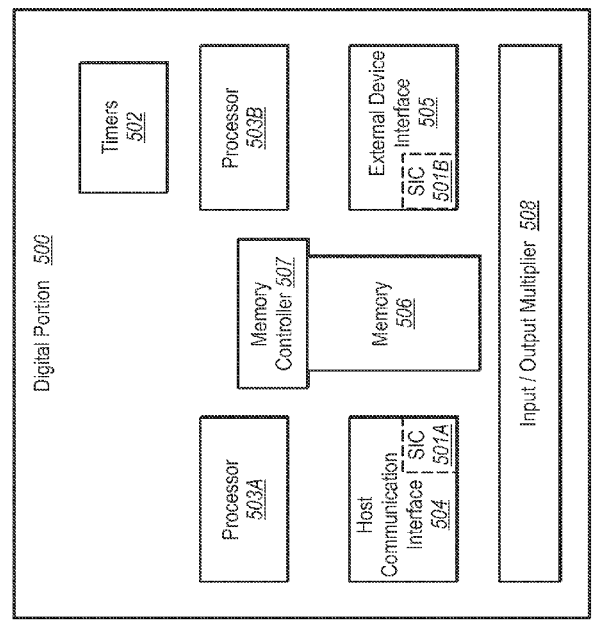
FIG. 5 illustrates a digital portion of the control chip illustrated in FIG. 4.

FIG. 5 illustrates the digital portion 500 of control chip 405 in further detail. For instance, a timer module 502 provides various timing signals used by the digital portion. Such timing signals may include, for example, programmable processor times. The timer module 502 may also act as a watchdog timer.

Two general-purpose processors 503A and 503B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 503A and 503B are each a 16-bit processor and may be identically structured.

A host communications interface 504 is used to communicate with the host using the serial clock line SCL and the serial data line SDA of the laser transmitter/receiver 400. The external device interface 505 is used to communicate with, for example, other modules within the laser transmitter/receiver 400 such as, for example, the post-amplifier 402, the laser driver 403, or the memory 406.

The memory 506 may be Random Access Memory (RAM). The memory control 507 shares access to the memory 506 amongst each of the processors 503A and 503B and with the host communication interface 504 and the external device interface 505. In one embodiment, the host communication interface 504 includes a serial interface controller 501A, and the external device interface 505 includes a serial interface controller 501B. The two serial interface controllers 501A and 501B may communicate using the two-wire interface described just above. One serial interface controller (e.g., serial interface controller 501B) being the master component, while the other serial interface controller (e.g., serial interface controller 501A) is a slave component.

An input/output multiplexer 508 multiplexes the various input/output pins of the control chip 405 to the various components within the control chip 405. This enables different components to dynamically assign pins in accordance with the then-existing operational circumstances of the chip. Accordingly, there may be more inputoutput nodes within the control chip 405 than there are pins available on the control chip 405, thereby reducing the footprint of the control chip 405. The interconnect matrix 235 of FIG. 2 represents one example of such an input/output multiplexer 508.

One possible example will now be described with respect to FIG. 5. Suppose the serial interface controller 501B is a master serial controller that may correspond to control mechanism 110 of FIG. 1 and controller 215 of FIG. 2. The serial interface controller 501B may also include selection mechanism 120. Memory 506 may include the configuration and communication data, which may be provided to serial interface controller 501B by the processors 503.

Having described a specific environment with respect to FIGS. 4 and 5 in which the principles of the present invention described with respect to FIGS. 1, 2, and 3 may be employed, it will be understood that this specific environment is only one of countless architectures in which the principles of the present invention may be employed. As previously stated, the principles of the present invention are not intended to be limited to any particular environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. An integrated circuit comprising:
  a plurality of external device interfaces for coupling the integrated circuit to a plurality of external devices, each external device interface supporting a communication protocol and each external device interface configured to couple more than one external device to the integrated circuit;
  a configurable control mechanism for controlling the selection of a designated one of the plurality of external device interfaces so as to facilitate communication between the integrated circuit and an external device using the communication protocol supported by the selected device interface, wherein the configurable control mechanism receives or accesses configuration data and communication data from other components of the integrated circuit; and
  a selection mechanism configured through the reception of one or more selection signals from the configurable control mechanism to select the designated one of the plurality of external device interfaces and to deactivate non-selected external device interfaces and further configured to receive communication data from the plurality of external device interfaces and to provide the received communication data to the configurable control mechanism;
  wherein the selection mechanism includes:
  a plurality of registers containing inactive default setting data;
  a plurality of multiplexers, each multiplexer having a selection node coupled to the control mechanism, a first input node coupled to the control mechanism, a second input node coupled to one of the plurality of registers, and an output node coupled to one of the plurality of external device interfaces;
  wherein each multiplexer is configured to provide data from the configurable control mechanism to the one of the plurality of external device interfaces connected to the output node of each multiplexer when the first input node of each multiplexer is selected by the selection node; and
  wherein each multiplexer is configured to provide the inactive default setting data from the plurality of registers connected to second input node of each multiplexer to the one of the plurality of external device interfaces connected to the output node of each multiplexer when the second input node of each multiplexer is selected by the selection node.

2. An integrated circuit in accordance with claim 1, wherein the configurable control mechanism is configured by microcode to designate one of the plurality of external device interfaces for selection.

3. An integrated circuit in accordance with claim 1, wherein the configurable control mechanism includes a serial controller and a serializer and deserializer.

4. An integrated circuit in accordance with claim 3, wherein the serial controller and the serializer and deserializer are included in one component.

5. An integrated circuit in accordance with claim 3, wherein the serial controller and the serializer and deserializer are separate components.

6. An integrated circuit in accordance with claim 1, wherein the selection mechanism includes:
a receive multiplexer having a selection node coupled to the control mechanism, a plurality of input nodes coupled to the plurality of external device interfaces, and an output node coupled to the control mechanism;
wherein the receive multiplexer is configured to provide data from the input node selected by the selection node to the control mechanism.

7. An integrated circuit in accordance with claim 1, wherein the configurable control mechanism and the selection mechanism are included in one component.

8. An integrated circuit in accordance with claim 1, wherein the configurable control mechanism and the selection mechanism are separate components.

9. An integrated circuit in accordance with claim 1, wherein one of the plurality of external device interfaces supports a Serial Peripheral Interface (SPI) protocol.

10. An integrated circuit in accordance with claim 1, wherein one of the plurality of external device interfaces supports an I²C protocol.

11. An integrated circuit in accordance with claim 1, wherein one of the plurality of external device interfaces supports a Finisar Serial Bus (FSB) protocol.

12. An integrated circuit in accordance with claim 1, wherein the integrated circuit is implemented in a laser transmitter/receiver.

13. An integrated circuit in accordance with claim 12, wherein the laser transmitter/receiver is one of a 1G laser transceiver, 2G laser transceiver, 4G laser transceiver, 8G laser transceiver, or 10G laser transceiver.

14. An integrated circuit in accordance with claim 12, wherein the laser transmitter/receiver is a laser transceiver suitable for fiber channels greater than 10G.

15. An integrated circuit in accordance with claim 12, wherein the laser transmitter/receiver is one of a 10 Gigabit Small Form Factor Pluggable (XFP) laser transceiver, a Small Form Factor Pluggable (SFP) laser transceiver, or a Small Form Factor (SFF) laser transceiver.

16. A method that is performed in an integrated circuit comprising a control mechanism, a selection mechanism, and a plurality of external device interfaces for coupling the integrated circuit with a plurality of external devices, each external device supporting a communication protocol, the method for the control mechanism to select one of the plurality of external device interfaces for use in communicating with an external device, the method comprising:
an act of the control mechanism designating which one of the plurality of external device interfaces to select, wherein the control mechanism receives or accesses configuration data and communication data from other components of the integrated circuit and wherein the plurality of external device interfaces are configured to couple more than one external device to the integrated circuit;
an act of the control mechanism using the selection mechanism by providing a first selection signal to the selection mechanism to select the designated one of the plurality of external device interfaces;
an act of the control mechanism using the selection mechanism by providing a second selection signal to the selection mechanism to deactivate the non-selected external device interfaces; and
an act of the control mechanism sending data to and receiving data from the selected external device interface via the selection mechanism using the communication protocol supported by the selected external device interface;
wherein the selection mechanism includes a plurality of registers containing inactive default data and a plurality of multiplexers, each multiplexer having a selection node coupled to the control mechanism, a first input node coupled to the control mechanism, a second input node coupled to one of the plurality of registers, and an output node coupled to one of the plurality of external device interfaces, the method further comprising:
an act of the multiplexer coupled to the designated external device interface providing data from the control mechanism to the designated external device interface when the first input node is selected by the selection node; and
an act of the remaining multiplexers providing the inactive default data from the plurality of registers to the external device interfaces that the multiplexers are coupled to when the second input node is selected by the selection node.

17. A method in accordance with claim 16, wherein the control mechanism includes a serial controller and a serializer and deserializer.

18. A method in accordance with claim 16, wherein the selection mechanism includes a receive multiplexer having a selection node coupled to the control mechanism, a plurality of input nodes coupled to the plurality of external device interfaces, and an output node coupled to the control mechanism, the method further comprising;
an act of the multiplexer providing data from the input node selected by the selection node to the control mechanism.

19. A method in accordance with claim 16, wherein the control mechanism and the selection mechanism are included in a single controller component.

* * * * *